(12) United States Patent
King

(10) Patent No.: US 10,314,283 B2
(45) Date of Patent: Jun. 11, 2019

(54) CURTAIN MACHINE HAVING SEALED CONTROL ENCLOSURE

(71) Applicant: Hog Slat, Inc., Newton Grove, NC (US)

(72) Inventor: Timothy Glenn King, Coats, NC (US)

(73) Assignee: Hog Slat, Inc., Newton Grove, NC (US)

( * ) Notice: Subject to any disclaimer, the term of this patent is extended or adjusted under 35 U.S.C. 154(b) by 259 days.

(21) Appl. No.: 15/172,585

(22) Filed: Jun. 3, 2016

(65) Prior Publication Data

US 2017/0347617 A1 Dec. 7, 2017

(51) Int. Cl.
*A01K 1/00* (2006.01)
(52) U.S. Cl.
CPC .................................. *A01K 1/007* (2013.01)
(58) Field of Classification Search
USPC ........................................................ 454/237
See application file for complete search history.

(56) References Cited

U.S. PATENT DOCUMENTS

| | | | |
|---|---|---|---|
| 1,857,368 A | 5/1932 | Flynn et al. | |
| 3,306,344 A | 2/1967 | Youngs | |
| 3,363,531 A * | 1/1968 | Kohlmeyer | A01K 1/0052 454/234 |
| 3,429,298 A * | 2/1969 | Thomason | A01K 1/007 119/448 |
| 3,511,299 A * | 5/1970 | Wolfe | A01K 31/00 160/1 |
| 3,669,350 A | 6/1972 | White | |
| 3,830,146 A * | 8/1974 | Kaiser | A01K 1/0064 160/1 |

(Continued)

FOREIGN PATENT DOCUMENTS

| | | |
|---|---|---|
| WO | 2013187713 A1 | 12/2013 |
| WO | 2015087481 A1 | 6/2015 |

OTHER PUBLICATIONS

Seal Design Guide, Apple Rubber Products, Jul. 8, 2014, p. 78 of 121 Seal Design Guide_Apple Rubber Products 2014_07_08.pdf.*

(Continued)

*Primary Examiner* — Gregory L Huson
*Assistant Examiner* — Frances F. Hamilton
(74) *Attorney, Agent, or Firm* — Withrow & Terranova, PLLC

(57) ABSTRACT

A curtain machine has a sealed control enclosure. The control enclosure, disposed in a machine interior of a machine housing, forms an enclosure interior and is configured to form a moisture impermeable seal separating the environment of the control enclosure from the environment of the machine interior and the external environment of the curtain machine. A motorized threaded member is configured to move a load block within the machine interior, for example to actuate a cable-based curtain mechanism, with both the load block and threaded member disposed outside the enclosure interior. The enclosure interior of the control enclosure includes a control circuit configured to operate the motor, and a mechanical limit switch configured to be mechanically actuated by the load block to stop the motor responsive to the load block moving along the threaded member beyond a predetermined threshold.

15 Claims, 7 Drawing Sheets

(56) References Cited

U.S. PATENT DOCUMENTS

| | | | | |
|---|---|---|---|---|
| 4,241,871 A * | 12/1980 | Newell, III | ......... | A01K 1/0064 236/1 E |
| 5,119,762 A | 6/1992 | Yockey et al. | | |
| 5,205,785 A * | 4/1993 | Richardson | ............ | A01K 1/007 119/448 |
| 5,458,537 A * | 10/1995 | Crider | ................... | A01K 1/007 119/448 |
| 5,492,082 A * | 2/1996 | Krevinghaus | ........ | A01K 1/0047 119/437 |
| 5,536,175 A * | 7/1996 | Forish | ................. | B60Q 1/2607 439/57 |
| 5,566,644 A | 10/1996 | Beery | | |
| 5,676,596 A * | 10/1997 | Masek | ................. | A01K 1/0047 119/448 |
| 5,813,599 A | 9/1998 | Hoff | | |
| 5,850,333 A * | 12/1998 | Owanesian | ......... | H05K 5/0213 361/704 |
| 6,042,475 A | 3/2000 | Darden | | |
| 6,069,420 A | 5/2000 | Mizzi et al. | | |
| 6,079,365 A | 6/2000 | Medlin et al. | | |
| 6,155,326 A | 12/2000 | Imhoff et al. | | |
| 6,273,813 B1 | 8/2001 | Arntjen | | |
| 6,307,749 B1 * | 10/2001 | Daanen | ................. | H05K 3/284 174/50.5 |
| 6,425,820 B1 * | 7/2002 | Kennedy | ................... | E21F 1/10 405/144 |
| 6,603,644 B2 * | 8/2003 | Yeh | ...................... | A47H 5/0325 361/23 |
| 6,612,359 B1 | 9/2003 | Moreau | | |
| 6,653,583 B1 * | 11/2003 | Asa | ...................... | H01H 9/0207 200/249 |
| 6,860,310 B2 | 3/2005 | Kubly et al. | | |
| 6,978,822 B2 | 12/2005 | Schoonen | | |
| 7,152,653 B1 | 12/2006 | Kubly et al. | | |
| 7,624,783 B2 | 12/2009 | Sensenig | | |
| 8,181,604 B1 | 5/2012 | Avila | | |
| 8,235,007 B1 * | 8/2012 | Rudolph | ................ | A01K 1/007 119/436 |
| 8,893,656 B2 | 11/2014 | Pitkaranta | | |
| 8,905,830 B2 | 12/2014 | Schmelzer | | |
| 9,577,489 B2 * | 2/2017 | Collins | ................. | H02K 1/185 |
| 2004/0094273 A1 | 5/2004 | Kubly et al. | | |
| 2005/0067119 A1 | 3/2005 | Schoonen | | |
| 2005/0081377 A1 * | 4/2005 | Brandenburg | ......... | H05K 5/065 29/855 |
| 2005/0224193 A1 | 10/2005 | Nelzi | | |
| 2006/0243398 A1 | 11/2006 | Schoonen | | |
| 2007/0099555 A1 | 5/2007 | Beauchamp | | |
| 2007/0256796 A1 | 11/2007 | Wedin | | |
| 2007/0293140 A1 | 12/2007 | Beauchamp | | |
| 2008/0011433 A1 | 1/2008 | Sensenig | | |
| 2009/0038551 A1 | 2/2009 | Baker et al. | | |
| 2009/0038552 A1 | 2/2009 | Baker et al. | | |
| 2011/0155330 A1 | 6/2011 | Schmelzer | | |
| 2014/0216665 A1 | 8/2014 | Niederer | | |
| 2014/0338277 A1 | 11/2014 | Dimmer et al. | | |
| 2016/0178223 A1 * | 6/2016 | James | ................... | F24F 11/001 165/250 |

OTHER PUBLICATIONS

Author Unknown, "HS583E: Curtain/Vent Machine Installation Manual, Enclosed Limit Switch," Ventilation Systems, Aug. 2015, Newton Grove, North Carolina, Hog Slat Inc., 24 pages.

* cited by examiner

CURTAIN MACHINE HAVING SEALED CONTROL ENCLOSURE

FIELD OF DISCLOSURE

The technology of the disclosure relates to a curtain machine, and more specifically to a curtain machine having a sealed control enclosure.

BACKGROUND

Adequate heating and cooling for livestock facilities are a major concern within the industry. The presence of a large number of animals in an enclosed facility can result in a large amount of excess heat being generated by the livestock themselves and by the interior environment of the facility. One conventional solution for this problem is the use of industrial curtain vents. Curtain vents selectively block or open one or more vents to respectively restrict or facilitate egress and ingress of airflow between the interior of the facility and the outside environment.

A curtain machine, also referred to as a curtain/vent machine, may be used to automatically raise or lower curtain vents to avoid the need for manual control. The curtain machine uses a powerful electric motor to rotate a threaded member, thereby moving a load block up and down in the linear direction. The load block may be operably connected to one or more curtains, for example via one or more cables, thereby allowing the motor to selectively raise or lower the curtains, which may be made of metal or other heavy materials.

One drawback of conventional curtain machines is that the machine and its components are exposed to the internal environment of the facility, which may subject the components to a high temperature and/or humidity over sustained periods of time. The hot and humid environment of the facility can result in accelerated corrosion of the metal components of the machine, and can significantly shorten the useful life of the machine and its components.

SUMMARY OF THE DISCLOSURE

Embodiments disclosed herein are directed to a curtain machine having a sealed control enclosure. The control enclosure, disposed in a machine interior of a machine housing, forms an enclosure interior and is configured to form a moisture impermeable seal separating the environment of the control enclosure from the environment of the machine interior and the external environment of the curtain machine. A motorized threaded member is configured to move a load block within the machine interior, for example to actuate a cable-based curtain mechanism, with both the load block and threaded member disposed outside of the enclosure interior. The enclosure interior of the control enclosure includes a control circuit configured to operate the motor, and a mechanical limit switch sub-assembly configured to be mechanically actuated by the load block to stop the motor responsive to the load block moving along the threaded member beyond a predetermined threshold. One advantage of this arrangement is that the control circuit and the mechanical limit switch sub-assembly can be disposed in a single, environmentally sealed housing, which reduces the amount of electrical components that are exposed to the environment of the machine interior and/or exterior.

In this regard, in one embodiment a curtain machine is disclosed. The curtain machine comprises a machine housing forming a machine interior. The curtain machine further comprises a control enclosure disposed in the machine interior, the control enclosure forming an enclosure interior, the enclosure interior forming a moisture impermeable seal. The curtain machine further comprises a motor disposed in the machine interior and outside the enclosure interior. The curtain machine further comprises a threaded member coupled to the motor, the threaded member configured to be rotated by the motor. The curtain machine further comprises a load block coupled to the threaded member in the machine interior and outside the enclosure interior, the load block configured to move along the threaded member in a linear direction of a longitudinal axis of the threaded member responsive to rotation of the threaded member by the motor. The curtain machine further comprises a control circuit disposed in the enclosure interior, the control circuit configured to operate the motor. The curtain machine further comprises a mechanical limit switch disposed in the enclosure interior, the mechanical limit switch configured to be mechanically actuated by the load block to stop the motor responsive to the load block moving along the threaded member beyond a predetermined threshold.

In another embodiment, a control enclosure for a curtain machine is disclosed. The control enclosure comprises a control enclosure configured to be disposed in a curtain machine interior, the control enclosure forming an enclosure interior, the enclosure interior forming a moisture impermeable seal. The control enclosure further comprises a control circuit disposed in the enclosure interior, the control circuit configured to operate a motor to cause a load block to move along a threaded member in a linear direction, the motor and the load block disposed outside the control enclosure. The control circuit further comprises a mechanical limit switch disposed in the enclosure interior, the mechanical limit switch configured to be mechanically actuated by the load block to stop the motor responsive to the load block moving in the linear direction beyond a predetermined threshold.

In another embodiment, a curtain system for a facility is disclosed. The system comprises a facility structure comprising a window and a curtain member movable between an open configuration and a closed configuration, wherein the curtain member covers at least a portion of the window in the closed configuration. The facility structure further comprises a cable mechanism coupled to the curtain member, the cable mechanism configured to move the curtain member between the open configuration and the closed configuration. The system further comprises a curtain machine disposed in the facility structure. The machine comprises a machine housing forming a machine interior. The machine further comprises a control enclosure disposed in the machine interior, the control enclosure forming an enclosure interior, the enclosure interior forming a moisture impermeable seal. The machine further comprises a motor disposed in the machine interior and outside the enclosure interior. The machine further comprises a threaded member coupled to the motor, the threaded member configured to be rotated by the motor. The machine further comprises a load block coupled to the threaded member and the cable mechanism in the machine interior and outside the enclosure interior, the load block configured to move along the threaded member in a linear direction of a longitudinal axis of the threaded member responsive to rotation of the threaded member by the motor, thereby moving the curtain member between the open configuration and the closed configuration via the cable mechanism. The machine further comprises a control circuit disposed in the enclosure interior, the control circuit configured to operate the motor. The machine further comprises a mechanical limit switch disposed in the enclosure interior, the mechanical limit switch configured to be mechanically actuated by the load block to stop the motor responsive to the load block moving along the threaded member beyond a predetermined threshold.

In another embodiment, a method of operating a curtain machine is disclosed. The method comprises a control circuit automatically rotating a threaded member via a motor to move a load block in a linear direction along the threaded member beyond a predetermined threshold, the control circuit disposed in a control enclosure environmentally isolated from the load block. The method further comprises mechanically actuating a limit switch disposed in the enclosure interior automatically based on the load block moving beyond the predetermined threshold.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Embodiments disclosed herein are directed to a curtain machine having a sealed control enclosure. The control enclosure, disposed in a machine interior of a machine housing, forms an enclosure interior forming a moisture impermeable seal separating the environment of the control enclosure from the environment of the machine interior and the external environment of the curtain machine. A motorized threaded member is configured to move a load block within the machine interior, for example to actuate a cable-based curtain mechanism, with both the load block and threaded member disposed outside of the enclosure interior. The enclosure interior of the control enclosure includes a control circuit configured to operate the motor, and a mechanical limit switch sub-assembly configured to be mechanically actuated by the load block to stop the motor responsive to the load block moving along the threaded member beyond a predetermined threshold. One advantage of this arrangement is that the control circuit and the mechanical limit switch sub-assembly can be disposed in a single, environmentally sealed housing, which reduces the amount of electrical components that are exposed to the environment of the machine interior and/or exterior.

Figure 1:
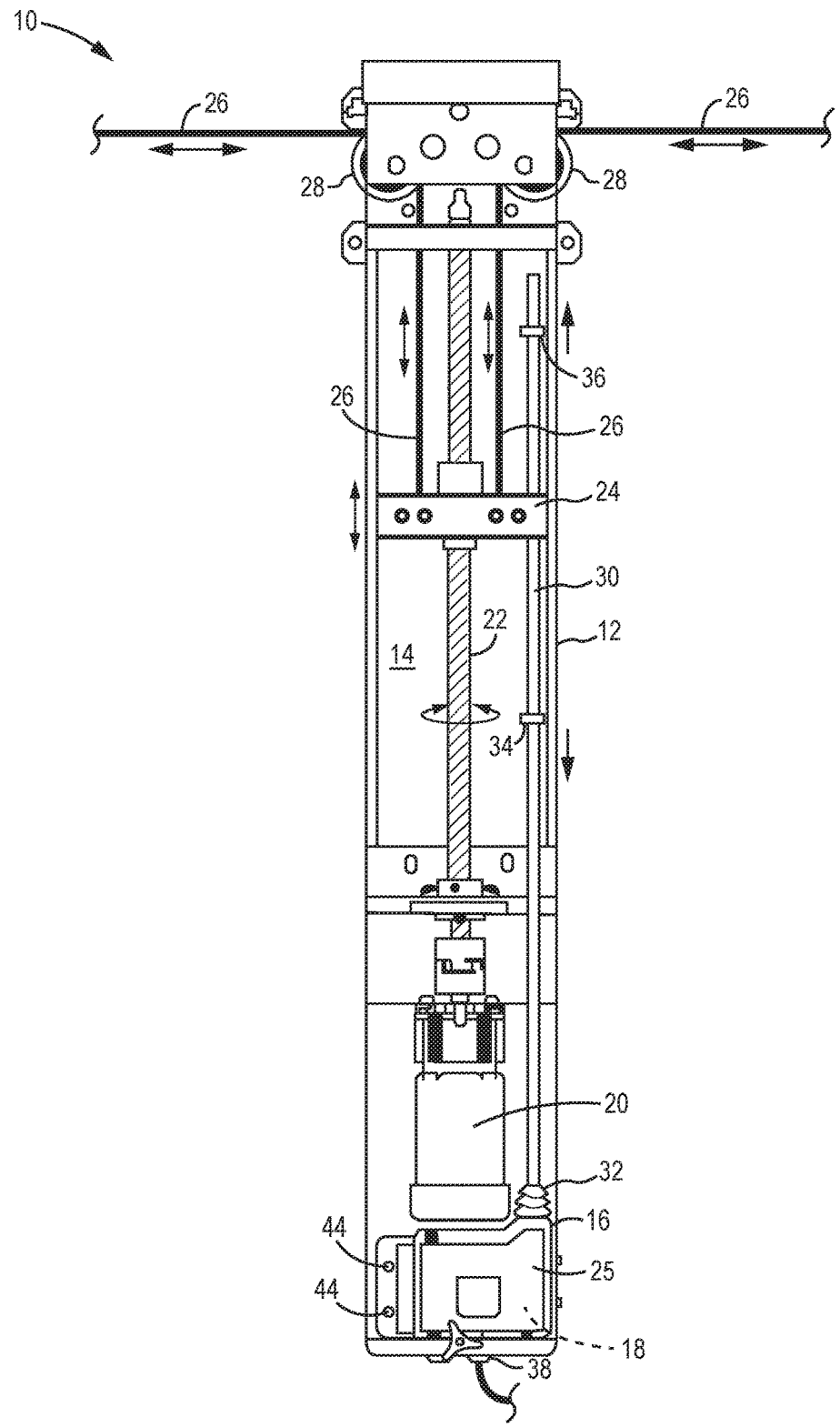
FIG. 1 illustrates a curtain machine having a sealed control enclosure having an integrated limit switch mechanism, according to an embodiment.

In this regard, FIG. 1 illustrates a curtain machine 10 according to an embodiment. In this embodiment, the curtain machine 10 comprises a machine housing 12 forming a machine interior 14, with a control enclosure 16 disposed therein. The control enclosure 16 forms an enclosure interior 18 configured to form a moisture impermeable seal separating the environment of the control enclosure 16 from the environment of the machine interior 14 and the external environment of the curtain machine 10. A motor 20 is disposed in the machine interior 14 outside the enclosure interior 18, and a threaded member 22 coupled to the motor 20 is configured to be rotated by the motor 20. A load block 24 is coupled to the threaded member 22 in the machine interior 14 outside the enclosure interior 18. In response to the motor 20 rotating the threaded member 22, the load block 24 is configured to move along the threaded member 22 in a linear direction, for example to actuate a cable 26 extending from the load block 24. In this example, the cable 26 extends around one or more pulleys 28 and may be operably coupled to a mechanical device, such as a curtain structure, a vent panel, or other device configured to be actuated by the cable 26.

The load block 24 is also slidably coupled to a mechanical limit rod 30 that extends into the enclosure interior 18 of the control enclosure 16 through a flexible bellows gasket 32. The flexible bellows gasket 32 allows the mechanical limit rod 30 to move upward and downward without breaking the environmental seal of the control enclosure 16. In this embodiment, the motor 20 is disposed between the load block 24 and the control enclosure 16. The mechanical limit rod 30 has a lower limit lock collar 34 disposed below the load block 24 and an upper limit lock collar 36 disposed above the load block 24. The lower limit lock collar 34 and upper limit lock collar 36 are each slidably disposed on the mechanical limit rod 30, and may be selectively secured at different positions along the mechanical limit rod 30 as desired. The lower limit lock collar 34 and upper limit lock collar 36 may be secured in a particular position along the mechanical limit rod 30 using, for example, a set screw (not shown) or friction fit, for example. The control enclosure 16 also includes one or more external gaskets 38 configured to route wiring from outside the curtain machine 10 into the enclosure interior 18 of the control enclosure 16 without breaking the environmental seal of the control enclosure 16.

Figure 2A:
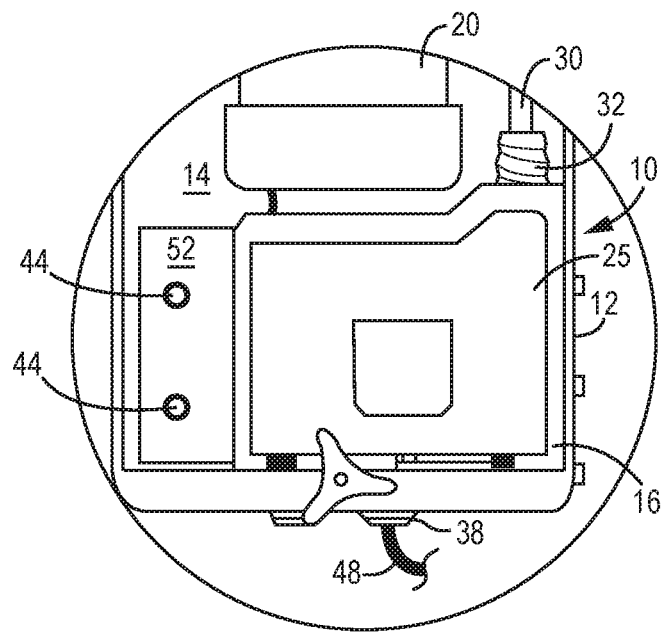
FIGS. 2A and 2B illustrate closed and opened views of the sealed control enclosure according to FIG. 1.
Figure 2B:
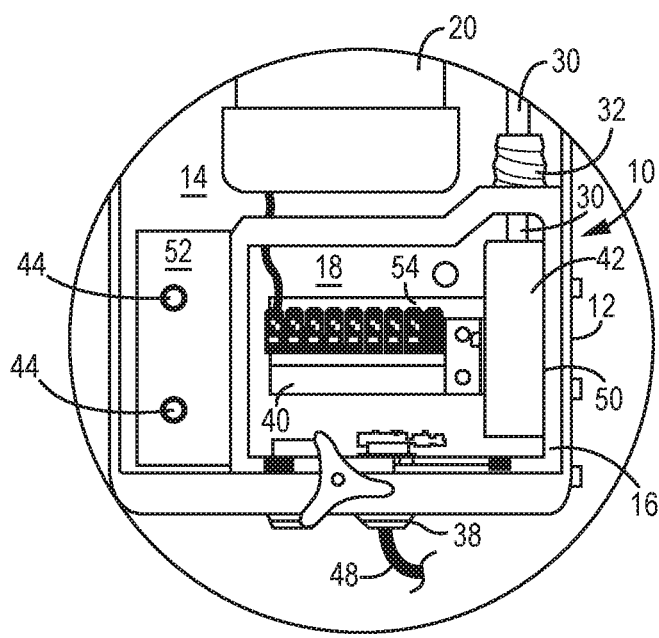

Referring now to FIGS. 2A and 2B, the control enclosure 16 includes a removable, sealable enclosure cover 25, configured to maintain the environmental seal of the enclosure interior 18. A control circuit 40 configured to operate the motor 20 is disposed in the enclosure interior 18 of the control enclosure 16, and a mechanical limit switch sub-assembly 42 is also disposed in the same enclosure interior 18. The mechanical limit switch sub-assembly 42 is configured to be mechanically actuated by the load block 24 to stop the motor 20 responsive to the load block 24 moving along the threaded member 22 beyond a predetermined threshold. In this example, the load block 24 moving down along the threaded member 22 causes the load block 24 (not shown) to engage the lower limit lock collar 34 (not shown) and push the mechanical limit rod 30 downward within the control enclosure 16 to contact and actuate a mechanical limit switch (described in greater detail with respect to FIG. 4 below) within the mechanical limit switch sub-assembly 42. Similarly, the load block 24 moving up along the threaded member 22 causes the load block 24 (not shown) to engage the lower limit lock collar 34 (not shown) and pull the mechanical limit rod 30 upward within the control enclosure 16. This upward motion may also contact and actuate a mechanical limit switch (not shown) or other type of mechanical operation within the mechanical limit switch sub-assembly 42. By disposing the control circuit 40 and the mechanical limit switch sub-assembly 42 in a single, environmentally sealed control enclosure 16, fewer electrical components are exposed to the environment of the machine interior and/or exterior.

As shown in FIGS. 2A and 2B, the control enclosure 16 includes manual controls 44 extending from the control enclosure 16 outside the enclosure interior 18. In this example, the manual controls 44 permit a user to activate a manual override mode and to manually switch the curtain machine 10 between manual and automatic operation. It should be understood, however, that more or fewer manual controls and functions may be included, as desired.

Figure 3A:
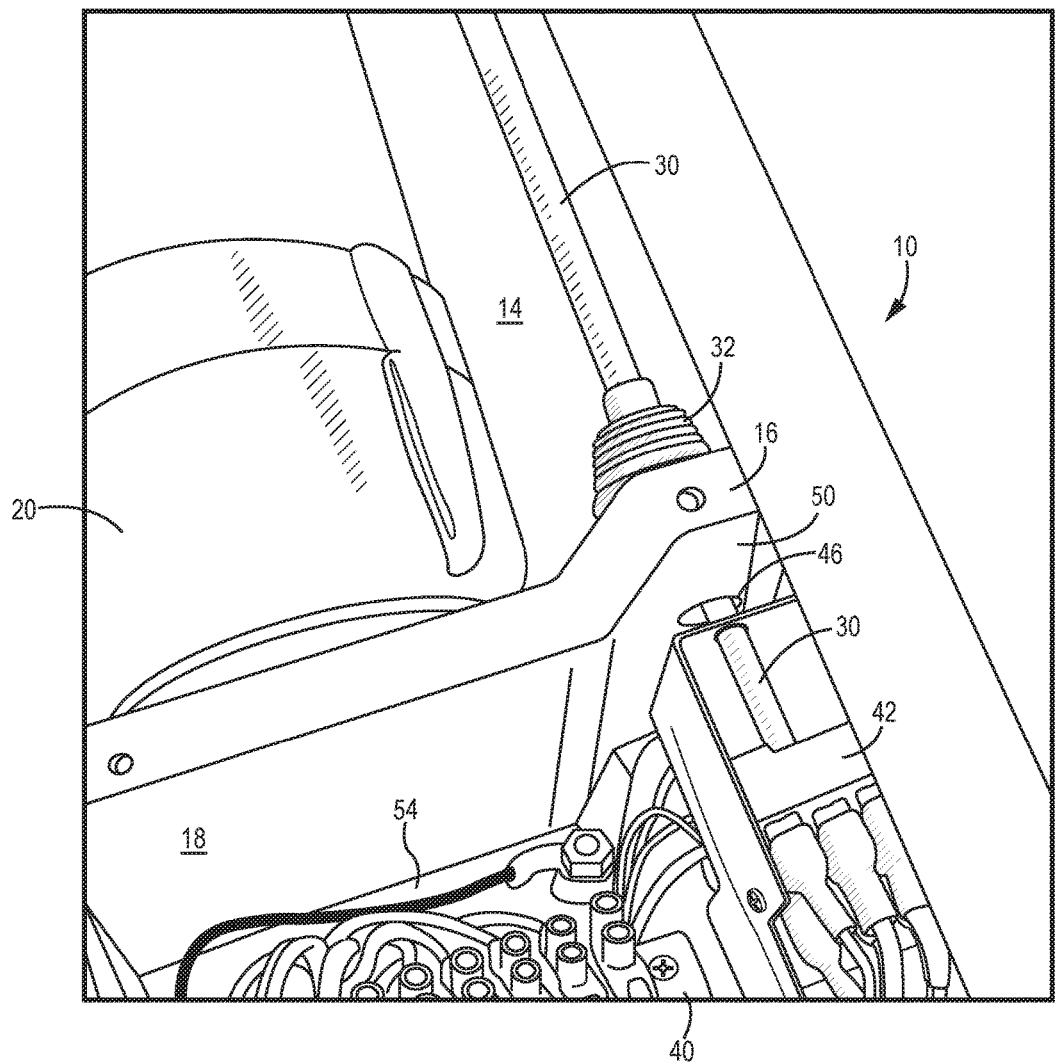
FIGS. 3A and 3B illustrate detailed views of the closed and opened control enclosure according to FIGS. 1-2B.
Figure 3B:
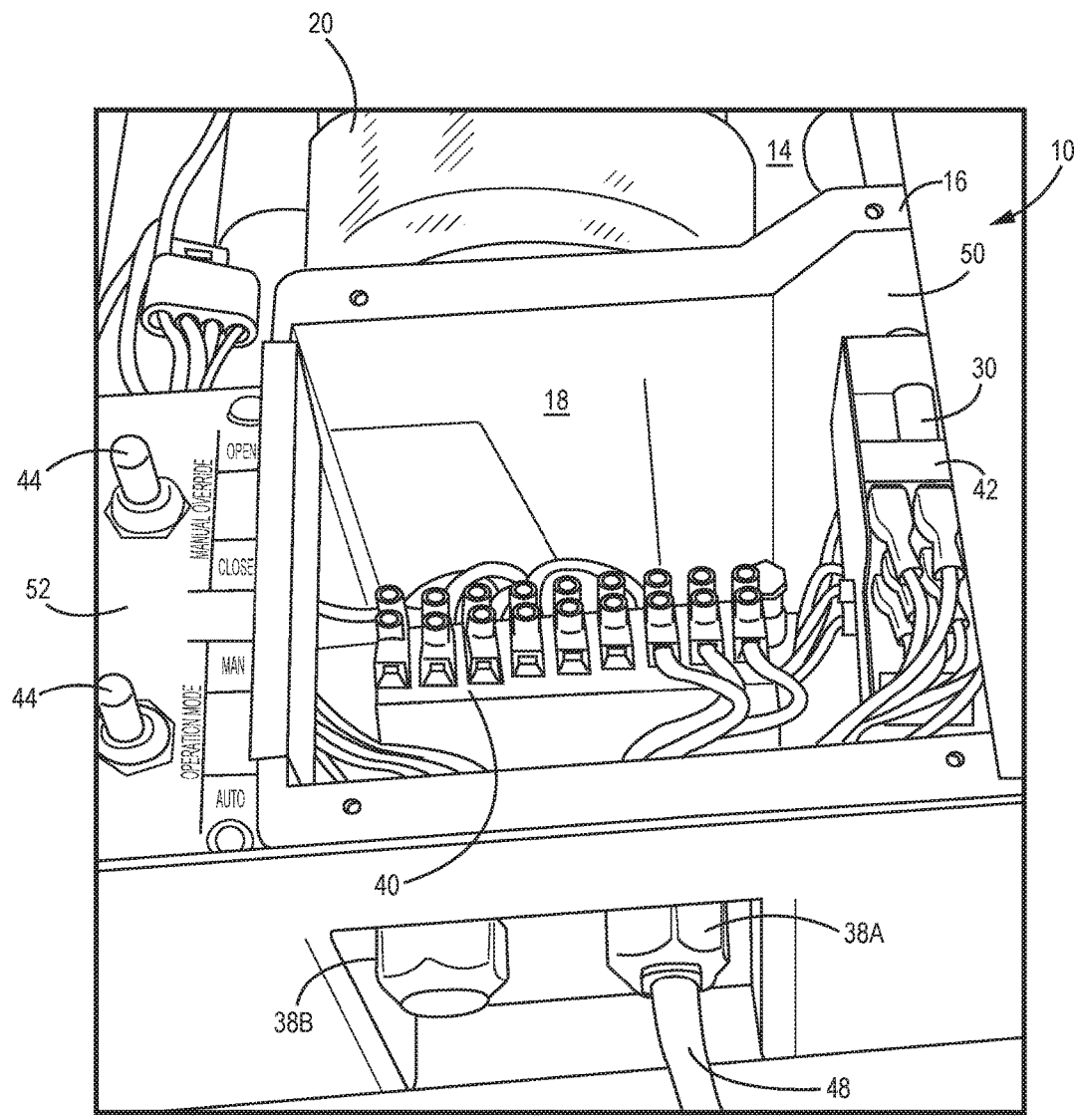

FIGS. 3A and 3B illustrate detailed views of the enclosure interior 18 of the control enclosure 16. In this regard, FIG. 3A illustrates the mechanical limit rod 30 extending through a rod aperture 46. As discussed above, the flexible bellows gasket 32 is disposed around the mechanical limit rod 30 such that the mechanical limit rod 30 is configured to move in a linear direction through the rod aperture 46 at a predetermined distance through a plurality of positions without breaking the environmental seal of the enclosure interior 18.

Referring now to FIG. 3B, a detailed view of the underside of the control enclosure 16 and the associated external gaskets 38 are illustrated. In this embodiment, a first gasket 38A routes a power cable 48 therethrough. It should be understood that, while a second gasket 38B is sealed in this embodiment, other types of cables or conduits may be routed through one or both external gaskets 38, such as, for example, an external control or communication cable (not shown). In this embodiment, the control enclosure 16 is a molded thermoplastic enclosure, but it should be understood that other materials, such as metals, and/or fabrication techniques may be used to form the control enclosure 16 so that the control enclosure 16 can be environmentally sealed.

As shown by FIG. 3B as well, the control enclosure 16 includes an access opening 50 configured to provide access to the control circuit 40 and/or mechanical limit switch sub-assembly 42 to a user, installer, and/or technician. The control enclosure 16 also includes a setback panel 52 disposed in a setback plane between the access opening 50 and a rear wall 54 of the control enclosure 16, as shown in detail in FIG. 2B. In this embodiment, the manual controls 44 are disposed through the setback panel 52 such that the manual controls 44 extend out from the setback panel 52, without extending beyond the plane defined by the enclosure cover 25 (not shown). In this manner, the control enclosure 16 can be disposed in a rectangular volume within the machine interior 14 without the manual controls 44 extending outside the rectangular volume, where the manual controls 44 could potentially block or interfere with other components of in the machine interior 14.

Figure 4:
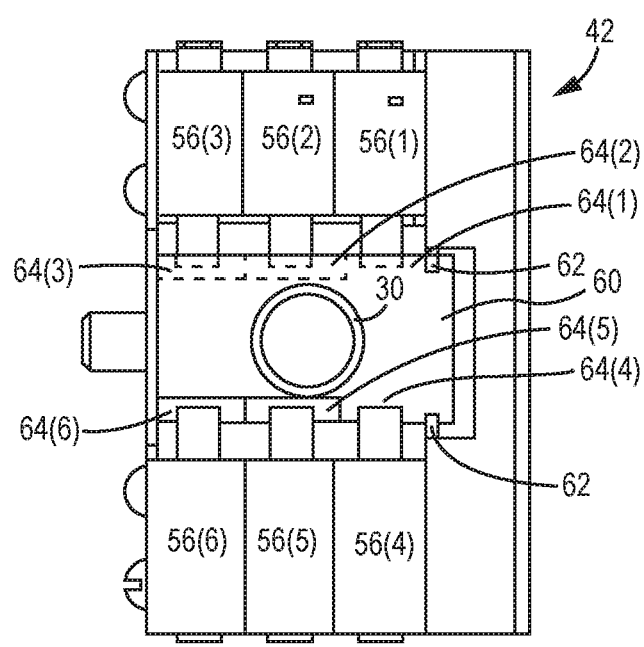
FIG. 4 illustrates a top view of a mechanical limit switch sub-assembly according to the embodiment of FIGS. 1-3B.

Referring now to FIG. 4, a top view of a mechanical limit switch sub-assembly 42 is illustrated. The mechanical limit switch sub-assembly 42 has a plurality of mechanical switches 56. For example, in this embodiment, safety switch 56(3) is configured to be actuated by a limit switch actuator block 60 coupled to the mechanical limit rod 30 and slidably coupled to one or more guide rails 62 running parallel to the mechanical limit rod 30. When the load block 24 (not shown) pushes the mechanical limit rod 30 via the lower limit lock collar 34 (not shown) downward past a predetermined failsafe point, the actuator block 60 actuates mechanical switches 56(1)-56(3) in sequence. To accomplish this function, the actuator block 60 has a series of stepped bosses 64(1)-64(3). For example, switch 56(1) is an auxiliary switch in this embodiment, and is configured to activate a supplemental function, such as an accessory, in response to the load block 24 moving downward past a first predetermined threshold. If the load block 24 (not shown) continues to move downward past a second threshold, switch 56(2), which is a limit switch, is actuated, which is configured to stop the motor 20 (not shown) without fully shutting down the curtain machine 10 (not shown). As discussed above, if the safety switch 56(3) fails and the load block 24 (not shown) continues to move downward past a third threshold, safety switch 56(3) is actuated, which causes the curtain machine 10 (not shown) to shut off.

Similarly, the actuator block 60 has a second plurality of stepped bosses 64(4)-64(6) configured to actuate a second plurality of mechanical switches 56(4)-56(6) in sequence, in response to the load block 24 (not shown) moving upward beyond a predetermined threshold defined by the upper limit lock collar 36 (not shown). It should be understood that, in this embodiment, the lower limit lock collar 34 and upper limit lock collar 36 are independently movable along the mechanical limit rod 30, thereby allowing a user or installer to selectively fine-tune the positions of the load block 24 (not shown) that cause the mechanical limit rod 30 to actuate the different mechanical switches 56. One advantage of this arrangement is that the control enclosure 16 can be disposed proximate the motor 20 to reduce the length of the wiring connecting the control circuit 40 and mechanical limit switch sub-assembly 42, because the load block 24 does not need to be disposed proximate to the mechanical limit switch sub-assembly 42.

Figure 5A:
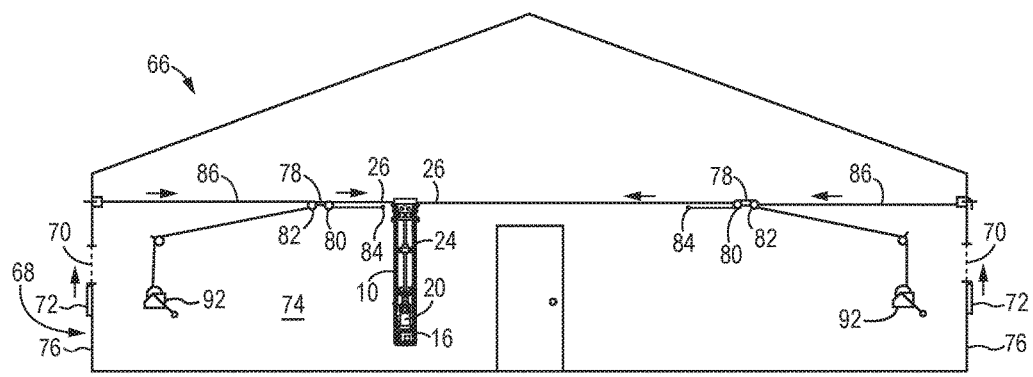
FIGS. 5A and 5B illustrate a front and top perspective view of a system including a livestock facility with curtain mechanisms controlled by the curtain machine of FIGS. 1-4.
Figure 5B:
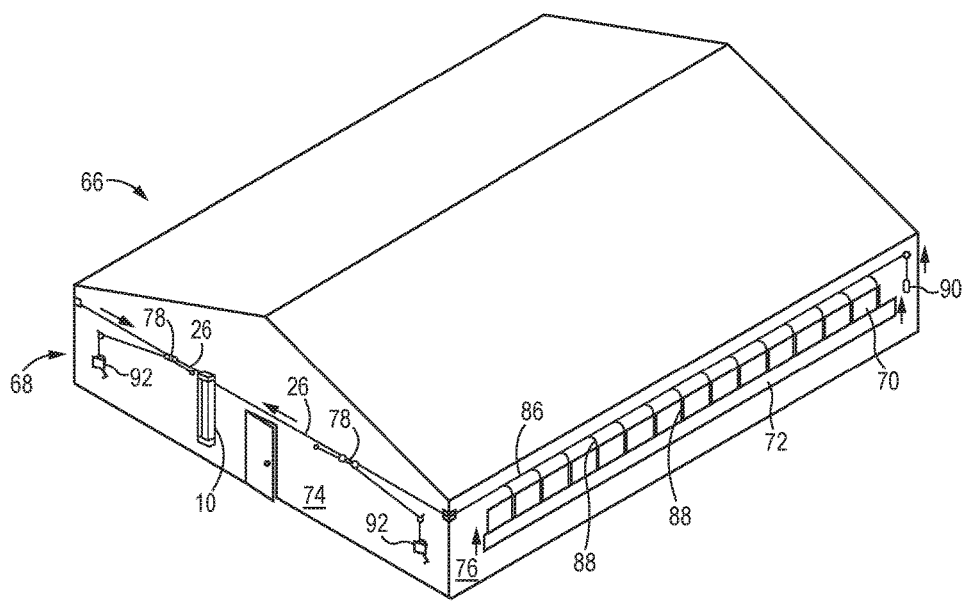

FIGS. 5A and 5B illustrate a system 66 including the curtain machine 10 in use in a facility 68, such as for example, a livestock facility. In this embodiment, the facility 68 is a large, enclosed livestock facility having a plurality of ventilation windows 70 for permitting airflow between the interior and exterior of the facility 68. A plurality of curtains 72 are vertically movable to block or open the ventilation windows 70 depending on the ventilation needs of the facility 68. For example, for a livestock facility in a temperate climate, it may be desirable to have the curtains 72 open during the summer months, in order to vent as much heat generated by the livestock and the environment from the facility 68 as possible. During the winter months, the curtains 72 may remain closed, to contain the heat generated by the livestock and environment. The curtains 72 may also be partially opened or closed as needed, according to the requirements of the facility 68 and the external and internal environmental conditions of the facility 68.

In this regard, one or more curtain machines 10 is installed on a wall 74 of the facility 68. The load block 24 of the curtain machine 10 is coupled to a pair of cables 26 extending toward opposite sidewalls 76 of the facility 68. In this embodiment, the ventilation windows 70 and curtains 72 are disposed on the opposite sidewalls 76. Each cable 26 is routed through a block 78 having a pair of pulleys 80, 82. The cable 26 passes around the machine-facing pulley 80 and is secured to an anchor point 84 on the wall 74.

The block 78 also has a curtain cable 86 passing therethrough around a curtain-facing pulley 82. The curtain cable 86 is routed around the sidewall and is coupled to each of the curtains 72 as is known in the art, such as, for example, through a series of fixed pulleys or other types of cable guides (not shown). A plurality of branch cables 88 branch off from the curtain cable at set points along the sidewall 76 such that movement of the curtain cable 86 toward the wall 74 causes the curtains 72 to be raised to cover the ventilation windows 70. A counterweight 90 is coupled to the distal end of the curtain cable 86 to tension the curtain cable 86 and bias the curtain cable along a cable path away from the curtain machine 10.

When the motor 20 of the curtain machine 10 is activated by the control circuit 40 and/or the manual controls 44 of the curtain machine 10, the load block 24 moves up or down along the threaded member 22. If the load block 24 moves down along the threaded member 22, the block 78 is pulled along the cable path toward the curtain machine 10, which in turn pulls the curtain cable 86 toward the machine wall, thereby causing the curtains 72 to close the ventilation windows 70. If the load block 24 moves up along the threaded member, the block 78 is allowed to move away from the curtain machine 10 and the counterweight 90 moves the curtain cable 86 along the cable path away from the curtain machine 10, thereby lowering the curtains 72 and opening the ventilation windows 70. In this embodiment, the curtain cable 86 is also connected to a manual crank mechanism 92, which allows the curtain cable 86 to be manually reeled or unreeled to manually raise or lower the curtains 72 without the use of the curtain machine 10. This manual operation may be performed in the event of a curtain machine 10 failure, or as a way to calibrate or fine tune the positioning of the curtains 72 with respect to the ventilation windows 70.

As discussed above, if the load block 24 moves too far up or down the threaded member 22, portions of the machine can become damaged, including the load block 24, threaded member 22, motor 20, or machine housing 12, for example. Thus, it is desirable to include a failsafe mechanism to prevent the motor from moving the load block 24 too far in either direction.

Figure 6:
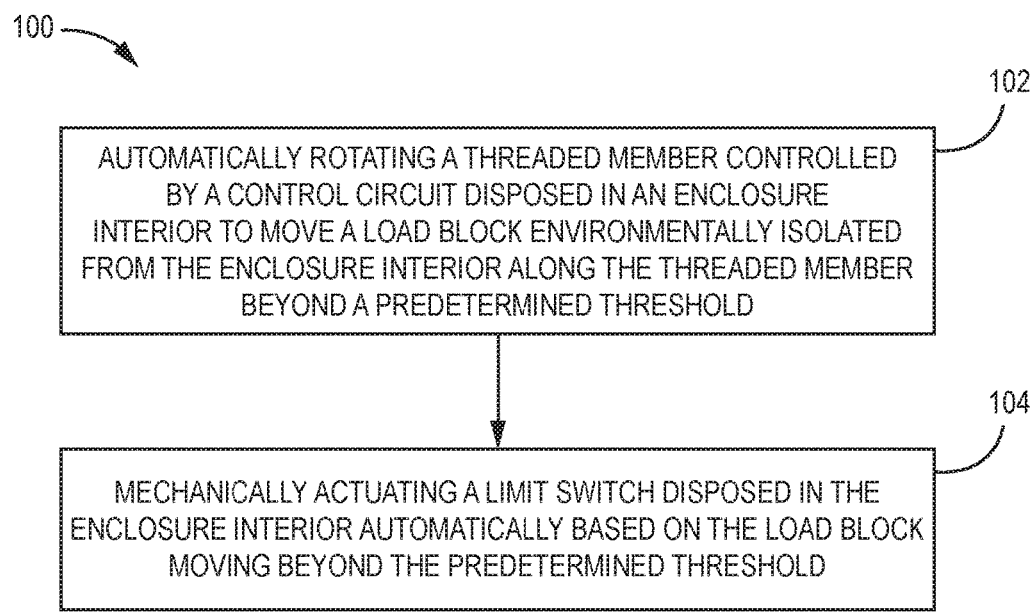
FIG. 6 is a flowchart of a method of operating the curtain machine of FIGS. 1-4, according to an embodiment.

FIG. 6 illustrates a method 100 of operating a curtain machine, such as the curtain machine 10, according to an embodiment. In this embodiment, the method 100 comprises a control circuit automatically rotating a threaded member via a motor controlled by a control circuit, the control circuit disposed in an enclosure interior of a control enclosure to move a load block environmentally isolated from the enclosure interior in a linear direction along the threaded member beyond a predetermined threshold (Block 102). The control circuit is disposed in the enclosure interior of the control enclosure. The method further comprises mechanically actuating a limit switch disposed in the enclosure interior automatically based on the load block moving beyond the predetermined threshold (Block 104).

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided that come within the scope of the appended claims and their equivalents. Although specific terms are employed herein, they are used in a generic and descriptive sense only and not for purposes of limitation.

I claim:

1. A curtain machine, comprising:
   a machine housing forming a machine interior;
   a control enclosure disposed in the machine interior, the control enclosure forming an enclosure interior and comprising a rod aperture, the control enclosure forming a moisture impermeable seal between the machine interior and the enclosure interior;
   a motor disposed in the machine interior and outside the enclosure interior;
   a threaded member coupled to the motor, the threaded member configured to be rotated by the motor;
   a load block coupled to the threaded member in the machine interior and outside the enclosure interior, the load block configured to move along the threaded member in a linear direction of a longitudinal axis of the threaded member responsive to rotation of the threaded member by the motor;
   a control circuit disposed in the enclosure interior, the control circuit configured to operate the motor;
   a mechanical limit switch disposed in the enclosure interior, the mechanical limit switch configured to be mechanically actuated by the load block to stop the motor responsive to the load block moving along the threaded member beyond a predetermined threshold; and
   a limit switch actuator configured to actuate the mechanical limit switch responsive to the load block moving along the threaded member beyond the predetermined threshold, the limit switch actuator comprising a linear rod extending between the load block and the enclosure interior through the rod aperture of the control enclosure.

2. The curtain machine of claim 1, wherein the motor is disposed in the machine interior between the control enclosure and the load block.

3. The curtain machine of claim 1, the control enclosure comprising a flexible bellows gasket coupled to the rod proximate the rod aperture, the flexible bellows gasket configured to allow the rod to move in a linear direction through the rod aperture of the control enclosure without breaking the moisture impermeable seal of the enclosure interior.

4. The curtain machine of claim 1, further comprising a manual actuator disposed on the control enclosure at least partially outside the enclosure interior, the manual actuator configured to operate the motor without breaking the moisture impermeable seal of the control enclosure.

5. The curtain machine of claim 4, the control enclosure comprising:
   a rear panel defining a rear plane;
   a front panel defining a front plane; and
   a setback panel defining a setback plane between the front plane and the rear plane, the setback plane parallel to the front plane;
   wherein the manual actuator is disposed on the setback panel, and wherein the manual actuator does not intersect the front plane.

6. The curtain machine of claim 1, wherein the control enclosure comprises a molded thermoplastic enclosure.

7. A control enclosure for a curtain machine, comprising:
   a control enclosure configured to be disposed in a curtain machine interior, the control enclosure forming an enclosure interior and comprising a rod aperture, the control enclosure forming a moisture impermeable seal between the machine interior and the enclosure interior;
   a control circuit disposed in the enclosure interior, the control circuit configured to operate a motor to cause a load block to move along a threaded member in a linear direction, the motor and the load block disposed outside the control enclosure;
a mechanical limit switch disposed in the enclosure interior, the mechanical limit switch configured to be mechanically actuated by the load block to stop the motor responsive to the load block moving in the linear direction beyond a predetermined threshold; and
a limit switch actuator configured to actuate the mechanical limit switch responsive to the load block moving along the threaded member beyond the predetermined threshold, the limit switch actuator comprising a linear rod extending between the load block and the enclosure interior through the rod aperture of the enclosure.

8. The control enclosure of claim 7, wherein the motor is disposed in the machine interior between the control enclosure and the load block.

9. The control enclosure of claim 7, the control enclosure comprising:
a flexible bellows gasket coupled to the rod proximate the rod aperture, the flexible bellows gasket configured to allow the rod to move in a linear direction through the rod aperture of the control enclosure without breaking the moisture impermeable seal of the control enclosure.

10. The control enclosure of claim 7, further comprising a manual actuator disposed on the control enclosure at least partially outside the enclosure interior, the manual actuator configured to operate the motor without breaking the moisture impermeable seal of the control enclosure.

11. The control enclosure of claim 10, the control enclosure comprising:
a rear panel defining a rear plane;
a front panel defining a front plane; and
a setback panel defining a setback plane between the front plane and the rear plane, the setback plane parallel to the front plane;
wherein the manual actuator is disposed on the setback panel, and wherein the manual actuator does not intersect the front plane.

12. The control enclosure of claim 7, wherein the control enclosure comprises a molded thermoplastic enclosure.

13. A curtain system for a facility, the system comprising:
a facility structure comprising:
an opening;
a curtain member movable between an open configuration and a closed configuration, wherein the curtain member covers at least a portion of the opening in the closed configuration; and
a cable mechanism coupled to the curtain member, the cable mechanism configured to move the curtain member between the open configuration and the closed configuration; and
a curtain machine disposed in the facility structure, the machine comprising:
a machine housing forming a machine interior;
a control enclosure disposed in the machine interior, the control enclosure forming an enclosure interior and comprising a rod aperture, the control enclosure forming a moisture impermeable seal between the machine interior and the enclosure interior;
a motor disposed in the machine interior and outside the enclosure interior;
a threaded member coupled to the motor, the threaded member configured to be rotated by the motor;
a load block coupled to the threaded member and the cable mechanism in the machine interior and outside the enclosure interior, the load block configured to move along the threaded member in a linear direction of a longitudinal axis of the threaded member responsive to rotation of the threaded member by the motor, thereby moving the curtain member between the open configuration and the closed configuration via the cable mechanism;
a control circuit disposed in the enclosure interior, the control circuit configured to operate the motor; and
a mechanical limit switch disposed in the enclosure interior, the mechanical limit switch configured to be mechanically actuated by the load block to stop the motor responsive to the load block moving along the threaded member beyond a predetermined threshold; and
a limit switch actuator configured to actuate the mechanical limit switch responsive to the load block moving along the threaded member beyond the predetermined threshold, the limit switch actuator comprising a linear rod extending between the load block and the enclosure interior through the rod aperture of the control enclosure.

14. The curtain system of claim 13, wherein the facility structure further comprises a flexible bellows gasket coupled to the rod proximate the rod aperture, the flexible bellows gasket configured to allow the rod to move in a linear direction through the rod aperture of the control enclosure without breaking the moisture impermeable seal of the enclosure interior.

15. A method of operating a curtain machine, the method comprising:
a control circuit automatically rotating a threaded member via a motor to move a load block within a machine interior of a machine housing in a linear direction along the threaded member beyond a predetermined threshold, the control circuit disposed in an enclosure interior of a control enclosure in the machine interior of the machine housing, the control enclosure forming a moisture impermeable seal between the machine interior and the enclosure interior; and
automatically actuating a mechanical limit switch disposed in the enclosure interior based on the load block moving beyond the predetermined threshold by movement of a linear rod of a limit switch actuator through a rod aperture of the control enclosure with a flexible bellows gasket coupled to the linear rod proximate the rod aperture to allow the linear rod to actuate the mechanical limit switch by moving in a linear direction through the rod aperture of the control enclosure without breaking the moisture impermeable seal.

* * * * *